3,274,759
ADJUSTABLE FRAME STRUCTURE FOR AIR
FILTERS AND THE LIKE
Vincent G. Bell, Jr., Wayne, Pa., assignor to Safeguard
Business Systems Corporation, a corporation of Delaware
Filed Apr. 7, 1965, Ser. No. 446,226
2 Claims. (Cl. 55—482)

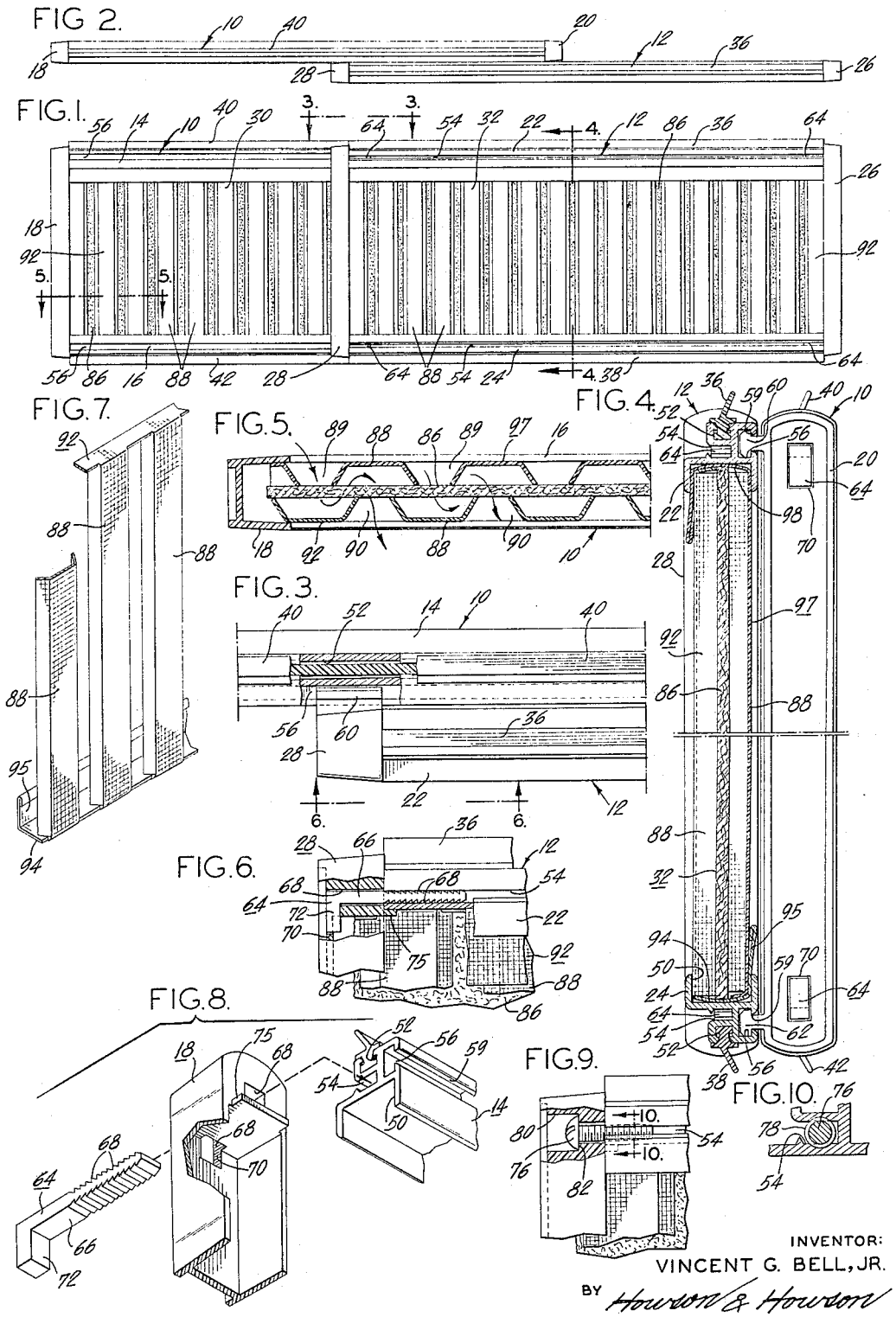

The invention relates to adjustable frame structures suitable and especially adapted for use in air filters such as are commonly designated as window screens or ventilators.

Air filters are known which are adapted for ready installation in and removal from openings such as window sashes of differing widths. Ordinarily they consist of a pair of interlocked screen-supporting rectangular frames adapted to slide longitudinally with respect to each other along the direction of the width of the window or opening in which they are to be placed. However, such structures are commonly limited with respect to the ease and cheapness with which their parts can be manufactured and assembled and with respect to their strength, rigidity, ease of operation and longevity.

It is an object of this invention to provide a new and useful adjustable frame structure suitable and especially adapted for use in air filters such as window screens or ventilators.

Another object is to provide such a structure which is easy and inexpensive to assemble.

A further object is to provide such a structure which is inexpensive to manufacture.

A further object is to provide such a structure which is characterized by a high degree of rigidity, especially with respect to resistance to flexing.

Another object is to provide a new and useful air filter suitable for use as a window screen or ventilator and employing said adjustable frame structure.

In accordance with the invention these and other objects are achieved by the provision of a first and second generally-rectangular frame, each frame including a pair of rails and a pair of end-frame members positioned at opposite ends of the rails to hold them in spaced-apart, substantially parallel relationship. Each of said rails has a longitudinally-extending, key-retaining guideway therein, and one end-frame member of each of said frames has thereon a pair of key members slidably retained in the guideway of the other frame and longitudinally-slidable therein to hold the two frames in confronting, overlapping mutually-slidable relationship. In accordance with a further preferred feature, the key members are integral with their corresponding end-frame members, preferably constituting a single molded plastic piece therewith. Preferably also the guideways and the portions of the key members retained therein are rectangular in cross-section. In accordance with another feature of the preferred form of the invention, the rails are also provided with additional longitudinally-extending recesses at their ends and the end-frame members are secured to the ends of the rails by fasteners each of which extends through its corresponding end-frame member into the corresponding aperture in the end of the adjacent rail. In one embodiment of the invention the apertures in the ends of the rails are of a size to be gripped by a self-tapping screw inserted through the end-frame member adjacent thereto; however, in accordance with a further feature of the invention, the end-frame members are preferably secured to the ends of the rails by connectors of rectangular cross-section, the end-frame members and said apertures providing openings also rectangular in cross-section through which the connectors are inserted; preferably each of the latter type of connectors is provided with projections on its outer surface to lock it in position in the corresponding end rail once it has been pressed therein.

Preferably also, each of the rails is identical with the others, and each of the end-frame members is the same as the others with the exception that two of them are provided with the above-mentioned key members. Although any desired type of air filtering arrangement or screening may be mounted within the frame, in the particularly advantageous form of the invention described in detail hereinafter each of the end-frame members and each of the rails is provided with a channel facing the interior of its corresponding frame in which the edges of the filter or screen may be readily retained.

With the above-described construction, manufacture and assembly is very simple. The end-frame members can be made by a simple plastic molding process, the key members on two of the end-frame members being formed simultaneously and integrally with two of the end-frame members during molding. All four rails may be identical, and provided with appropriate grooves and slots by simple extruding processes. In applications such as that shown in the preferred embodiment, the air filter need only be pressed into position between the rails and the end-frame members, the key members slid into their corresponding guideways and the end-frame members secured to the rails by means of the self-tapping screws, or by means of the plastic connectors which are merely pressed into the openings provided in the end-frame members and the rails.

Rigidity of the complete frame assembly is significantly enhanced by the use of the above-described rectangularly cross-sectioned key members which fit closely, although slidingly, within the corresponding rectangularly cross-sectioned guideways. The combination of the rectangularly cross-sectioned connectors and the corresponding rectangularly cross-sectioned apertures in the ends of the rails has also been found to produce an enhance degree of rigidity, particularly in resistance to twisting forces applied between opposite ends of the frame assembly.

Other objects and features of the invention will be more readily comprehended from a consideration of the following detailed description, taken in connection with the accompanying drawings, in which:

FIGURE 1 is a side elevation view of an adjustable ventilator constructed in accordance with the invention;

FIGURE 2 is a top view of the structure shown in FIGURE 1;

FIGURE 3 is a fragmentary top view, partly in section, taken along the lines 3—3 of FIGURE 1;

FIGURE 4 is a sectional view taken along lines 4—4 of FIGURE 1;

FIGURE 5 is a fragmentary sectional view taken along lines 5—5 of FIGURE 1;

FIGURE 6 is a fragmentary view, partly in section, taken along lines 6—6 of FIGURE 3;

FIGURE 7 is a perspective view showing a portion of the particular air filtering screen used in the embodiment of the invention illustrated in FIGURE 1;

FIGURE 8 is an exploded fragmentary view, in perspective, of a portion of the left-most end-frame of the structure of FIGURE 1;

FIGURE 9 is a view similar to that of FIGURE 6 but illustrating a different connector arrangement for use in an alternative form of the invention; and FIGURE 10 is a fragmentary sectional view taken along line 10—10 of FIGURE 9.

Referring now particularly to the embodiments of the invention illustrated in detail in the drawings by way of example only, FIGURES 1 and 2 show a first generally-rectangular frame 10 and a second generally-rectangular frame 12 which are identical and which are secured together in overlapping longitudinally-slidable mutual relationship by means described hereinafter in detail. Frame 10 comprises a top rail 14 and a bottom rail 16 held in spaced-apart, substantially-parallel relationship to each other by end-frame member 18 and end-frame member 20. Frame 12 comprises upper rail 22 and lower rail 24, which rails are also held in spaced-apart, substantially-parallel relationship, in this case by means of the end-frame members 26 and 28. Frame 10 contains, and serves to mount, a first air filtering means 30, while frame 12 contains, and serves to mount, a second air filtering means 32. Each of the air filtering means 30 and 32 permits the passage of air through it from its front to its back surface, but presents very small openings for such a flow of air and thus serves to filter from the air any small foreign bodies contained therein. It will be understood that the total width of the ventilators shown in FIGURES 1 and 2 is readily manually adjustable, by sliding one frame with respect to the other, from a length approximately equal to the length of one frame to a length approximately equal to twice the individual frame length. Such a ventilator may then be placed at the bottom of a window opening, adjusted to fit snugly against the sides of the window opening, and the window sash lowered against the upper surface of the ventilator. To provide better air sealing, longitudinally-extending gasket strips 36 and 38 of resilient material are preferably retained in recessed channels in the upper surface of rail 22 and the lower surface of rail 24, respectively. Similar sealing strips or gaskets 40 and 42 are preferably provided in like manner at the top of rail 14 and the bottom of rail 16, respectively.

Referring particularly to FIGURES 3 and 4, each of the rails such as 14 and 16 contains four channels such as 50, 52, 54 and 56. Channel 52 is suitably recessed at its bottom to retain the resilient gaskets such as 40 therein. Channel 50 embraces and holds snugly the upper end of air filter means 30 to hold it in proper position. Channel 54 provides the end apertures in rail 14 into which the end-frame connectors to be described hereinafter are pressed or screwed.

Each of the channels such as 56 in the rails has a substantially rectangular cross-section and a restricted longitudinally-extending opening 59 facing the adjacent frame. Each of end-frame members 28 and 20 has a pair of key members, such as 60 and 62, of rectangular cross-section formed integrally therewith and extending into and slidable retained in a corresponding channel such as 56 which serves as a guideway. All of the end-frame members are preferably of molded plastic, with the key members such as 60 preferably molded integrally therewith, while each of the rails is preferably of a metal, such as aluminum. Each of the key members such as 60 therefore fits closely, but slidably, in the corresponding guideway in which it is retained and extends for an appreciable distance along the guideway. Because of this mating configuration of the key members such as 60 and the corresponding guideways such as 56, both slidability and rigidity of construction are enhanced. Since each of the key members such as 60 is formed integrally with its corresponding end-frame member during assembly it is inserted into its corresponding guideway from the end of the corresponding rail while one of the end-frame members on the other frame is removed. Both end-frame members 28 and 20 are assembled in the same manner so that four interlocking keys are provided.

As is shown particularly clearly in FIGURES 4, 6 and 8, each of the end-frame members is secured near its top and bottom ends to the corresponding rails by means of an L-shaped connector 64, the longer leg 66 of which is rectangular in cross-section and is adapted to be inserted through the rectangularly cross-sectioned opening 68 in a frame member such as 18, and to extend into the adjacent end of the substantially-rectangularly cross-sectioned channel such as 54 in the corresponding rail such as 14. The outer portion of connector 64 which extends into channel 54 is preferably provided on at least some of its outer surfaces with locking projections 68 which permit the connector to be pressed into channel 54 by manual pressure, but cause it to remain locked in position thereafter. Preferably, such end-frame member is also provided, at the location through which the connector is inserted, with an additional rectangularly-recessed region such as 70 so that the shorter leg 72 of the connector 64 can be pressed into a flush position with respect to the surface of the end-frame member.

The rectangular cross-section of the connector 64 and of the opening 68 in end-frame member 28 and of the channel 54 with which it mates have been found to provide substantial additional rigidity for the entire frame structure.

As shown in FIGURE 8, adjacent each of the connector openings there is preferably also provided a protruding shelf such as 75 which fits into, and against the bottom of, each corresponding channel such as 50. This provides a convenient means for properly positioning the rails and end-frames during assembly and also provides additional strength.

Where desired, the end-frame members can be assembled to the rails by the alternative arrangement shown in FIGURES 9 and 10, in which the end of each rail is secured to its corresponding end-frame member by means of a self-tapping screw 76 having an outer thread surface 78 just slightly larger than the corresponding channel such as 54, so that when the screw 76 is inserted through the opening 80 in the frame member it can be screwed into the channel 54 with its head abutting the shoulder 82 until a tight joint is produced.

While any of a variety of air filtering arrangements may be utilized for the air filter means 30 and 32, in the present arrangement each air filtering means preferably has the form shown in detail in FIGURES 4, 5 and 7. It comprises a layer of skeletonized polymeric foam 86 having on opposite sides thereof an assembly of air-impervious channel members such as 88, the channel members on opposite sides of the foam 86 preferably being staggered along the length of the frames so that air passing through openings such as 89 between the channel members on one side of the foam can pass through the air filter only by flowing for at least a short distance along the length of the foam to an adjacent opening such as 90 between channel members on the opposite side of the foam, as indicated by the curved arrows.

FIGURE 7 shows one possible form for the array of channel members on one side of the foam. As shown, the channel members may be formed as an integral assembly 92 of wire screening suitably cut and bent to form the channel members in the desired position, and having a folded lower end 94 providing an end channel 95 which has an outer dimension to fit snugly into one of the channels such as 50 in a corresponding one of the rails. The assembly 97 of channel members located on the opposite side of foam 86 may be similarly formed, but is mounted in inverted position with respect to that shown in FIGURE 7 so that the folded underportion 98 of the other array of channel members contains and surrounds the upper end of channel member assembly 92, as shown particularly in FIGURE 4. The spaces between the wires of all of the meshes of which the channel members are formed may be made air impervious by filling them with a suitable plastic, for example, which may be a translucent plastic so that appreciable light is transmitted through the filter.

It will be understood that any of a variety of filter screens, such as ordinary window screening material, may be utilized for the air filter in various applications of the invention.

Accordingly, while the invention has been described with particular reference to particular embodiments thereof in the interest of complete definiteness, it will be under-

I claim:
1. An adjustable frame structure for window air-filters and the like, comprising:
a first generally-rectangular frame including a first pair of substantially identical horizontally-extending vertically spaced-apart rails and a first pair of end-frame members secured to opposite ends of said rails to hold said rails in substantially parallel relationship to each other;
each of said rails having formed therein a first keyed channel, a second keyed channel, a third channel and a fourth channel, each of said channels extending throughout the entire length of said rails;
said fourth channel in each of said rails facing inwardly of said frame to permit mounting for an air filter therein, said first keyed channel in each of said rails facing oppositely to said fourth channel, said second keyed channel in each of said rails facing horizontally outward from one side of said frame and having a substantially rectangular cross-section, and said third channel in each of said rails facing oppositely to said second keyed channel;
a second generally rectangular frame of substantially the same form as said first frame and including a second pair of horizontally-extending rails substantially identical with each other and with said first pair of rails and each having a first and second keyed channel and a third and a fourth channel all of which are of substantially the same form as said channels in said first pair of rails, and a second pair of end-frame members secured to opposite ends of said second pair of rails to hold said second pair of rails in substantially parallel, vertically spaced-apart relationship, said second pair of end-frame members being of substantially the same form as said first pair of end-frame members;
one of said first pair of end-frame members having a pair of key members integrally formed thereon, each of said key members having a key portion of substantially rectangular cross-section retained in closely-fitting longitudinally-slidable relationship in a different one of said second keyed channels in said second pair of rails, and one of said second pair of end-frame members having a pair of key members integrally formed thereon, each of said last-named key members having a key portion of substantially rectangular cross-section retained in closely-fitting longitudinally-slidable engagement in a different one of said second keyed channels in said first pair of rails;
resilient gaskets extending the length of said rails and retained in said first keyed channels thereof; and
connector means extending longitudinally into the ends of said third channels at the ends of each of said rails and secured to said end-frame members and the interior walls of said third channels for securing said end-frame members to said rails.

2. The frame structure of claim 1, in which said rails are of metal, said end-frame members are of plastic, and in which said connector means comprises eight self-locking pins of plastic material, each having a serrated portion of rectangular cross-section and each passing through one of said end-frame members and extending longitudinally into one end of a different one of said third channels to form a close fit between said serrated portion thereof and the interior walls of said one third channel.

References Cited by the Examiner

UNITED STATES PATENTS

| | | | |
|---|---|---|---|
| 356,563 | 1/1887 | Walsh | 160—105 |
| 813,727 | 2/1905 | Marquardt | 160—105 |
| 2,203,311 | 6/1940 | Sinclair | 55—496 X |
| 2,449,264 | 9/1948 | Wilkinson. | |
| 2,654,451 | 10/1953 | Schmidgall. | |
| 2,665,627 | 1/1954 | Fager | 160—105 X |
| 2,991,843 | 7/1961 | Bell. | |
| 3,124,055 | 3/1964 | Rubera | 98—99.5 |

ROBERT F. BURNETT, *Primary Examiner.*

D. K. DENENBERG, *Assistant Examiner.*